United States Patent [19]

Hirtz et al.

[11] Patent Number: 5,600,212

[45] Date of Patent: Feb. 4, 1997

[54] DEFLECTION CIRCUIT FOR A TELEVISION RECEIVER USING SYMMETRICAL DEFLECTION

[75] Inventors: Gangolf Hirtz, Villingen; Bernd Bader, Gschwend; Yves Francois, Villingen; Bernd Tenconi, Brigachtal; Fritz Ohnemus, VS-Villingen, all of Germany

[73] Assignee: Deutsche Thomson-Brandt GmbH, Villengen-Schwenningen, Germany

[21] Appl. No.: 19,979

[22] Filed: Feb. 22, 1993

[30] Foreign Application Priority Data

Feb. 20, 1992 [DE] Germany .......................... 42 05 146.0
Mar. 2, 1992 [DE] Germany .......................... 42 06 479.1
Mar. 7, 1992 [DE] Germany .......................... 42 07 350.2

[51] Int. Cl.[6] .................... G09G 1/04; H01J 29/70
[52] U.S. Cl. ........................ 315/391; 315/393; 315/371
[58] Field of Search .................... 315/391, 394, 315/395, 393, 371, 399; 335/210

[56] References Cited

U.S. PATENT DOCUMENTS

| | | | |
|---|---|---|---|
| 2,454,378 | 11/1948 | Forgue | 315/391 |
| 2,728,027 | 12/1955 | Scull, Jr. | 315/391 |
| 3,449,620 | 6/1969 | Caron et al. | 315/391 |
| 3,749,964 | 7/1973 | Hirata | 315/391 |
| 3,757,162 | 9/1973 | Johnson | 315/393 |
| 3,882,360 | 5/1975 | Williams, Jr. | 315/395 |
| 4,988,927 | 1/1991 | Spruck | 315/371 |
| 5,119,056 | 6/1991 | Itoh et al. | 335/210 |

FOREIGN PATENT DOCUMENTS

| | | | |
|---|---|---|---|
| 0200116 | 1/1986 | European Pat. Off. | H04N 3/30 |
| 0175409 | 3/1986 | European Pat. Off. | H04N 3/30 |
| 0341337 | 11/1989 | European Pat. Off. | H01J 29/76 |
| 3831239 | 3/1990 | Germany . | |
| 3916055 | 11/1990 | Germany . | |

*Primary Examiner*—Gregory C. Issing
*Attorney, Agent, or Firm*—Joseph S. Tripoli; Harvey D. Fried

[57] ABSTRACT

A deflection method and circuit for symmetrical horizontal scanning in a television tube utilizes a vertical deflection coil and an auxiliary vertical deflection coil. The vertical deflection coil is energized with a sawtooth vertical scanning current having a first slope during vertical trace to generate a first vertical deflection field. The auxiliary vertical deflection coil is energized with a sawtooth vertical auxiliary current having a line frequency and a second slope during horizontal trace equal but opposite to the first slope of the vertical scanning current to generate a second vertical deflection field. The first and second vertical deflection fields are superimposed in the tube to produce a stepped vertical deflection field.

8 Claims, 5 Drawing Sheets

DEFLECTION CIRCUIT FOR A TELEVISION RECEIVER USING SYMMETRICAL DEFLECTION

This invention is directed to a deflection circuit for a television tube using symmetrical deflection. When using symmetrical deflection the electron beam which scans the picture is initially deflected from the left edge to the right edge of the picture and then from the right edge to the left edge without the use of rapid flyback. Accordingly, the line deflection current is a sinusoidal waveform and a written line corresponds to the duration of half a period of the sine wave. With such symmetrical deflection, the vertical deflection must be a step shaped waveform since the lines written from the left to the right and the lines written from the right to the left would otherwise diverge. Consequently, the vertical deflection must change in a step like manner by a value which corresponds to the separation of two lines in the vertical direction during the line blanking period.

A vertical deflection current having a step shaped waveform of this type has a broad bandwidth. A relatively low frequency vertical deflection current, can be realized using conventional vertical deflection coils having a relatively high inductance of approximately 20 uH. Saddle/toroid coils in particular, have a relatively low parallel resonance which frequency lies in the order of a magnitude of the horizontal deflection frequency. It is therefore difficult to generate a step shaped deflection current having high frequency components in such deflection coil using justifiable means.

It is an object of the invention to generate a fault free step shaped vertical deflection field without having to make any changes to the previously used vertical deflection coil or by sufficiently increasing the expenditure on circuitry or performance. With the invention, the vertical deflection coil and the saw toothed deflection current supplied to it are unchanged. A line frequency correction current, which converts the saw toothed deflection field into a step shaped deflection field, is supplied to an auxiliary deflection coil which is separate from the vertical deflection coil. This solution is based on the knowledge that the correction current must cause a vertical deflection approximately equal to the distance between two lines. Accordingly, the current can be relatively small and the auxiliary deflection coil can be physically small. Because the coil is small, the inductance is low and the high frequency components of the line frequency correction current do not create the difficulties that the vertical deflection coil creates. Thus, with the invention, the various deflection currents are not superimposed before being supplied to the deflection coil. Instead the deflection currents generate different deflection fields which are superimposed in the picture tube. That is, the saw tooth deflection field, which causes the vertical deflection, and the line frequency deflection field, which is used for the conversion of the saw toothed vertical deflection field into a step-shaped vertical deflection field, are combined in the tube.

Unavoidable cross-talk between the horizontal deflection coil and the vertical deflection coil can cause interference with the vertical deflection field. Accordingly, with the invention, an additional correction current is supplied to the auxiliary deflection coil to compensate for the interference to the vertical deflection field caused by the cross-talk. An auxiliary deflection coil having a lower inductance is substantially better suited for such compensation than the vertical deflection coil is.

Symmetrical deflection requires the horizontal deflection current to be fully symmetrical. This means that the electron beam is located at the same spot for a particular picture point during scanning from left to right and from right to left. A disturbance of the symmetry, will cause two points which are superimposed in the original picture to be displaced along the scan line and a double image could be produced. Such distortion occurs especially with high resolution picture, tubes if harmonics of the deflection current are not sufficiently suppressed. Therefore, in accordance with a further development of the invention, a horizontal auxiliary deflection coil, which has a substantially lower inductance than the horizontal deflection coil is provided. A line frequency correction current is supplied to this horizontal auxiliary deflection coil to produce the desired symmetry in the waveform of the sinusoidal deflection current.

The invention is described with reference to the drawings, in which:

FIG. 1 is a block diagram of a television receiver incorporating the invention.

FIGS. 2a–c show curves useful in explaining the operation of the receiver shown in FIG. 1.

FIGS. 3a–c show curves useful in explaining cross-talk between the deflection coils.

FIGS. 4a–d show curves useful in explaining a circuit for reducing cross-talk.

Figure 9:
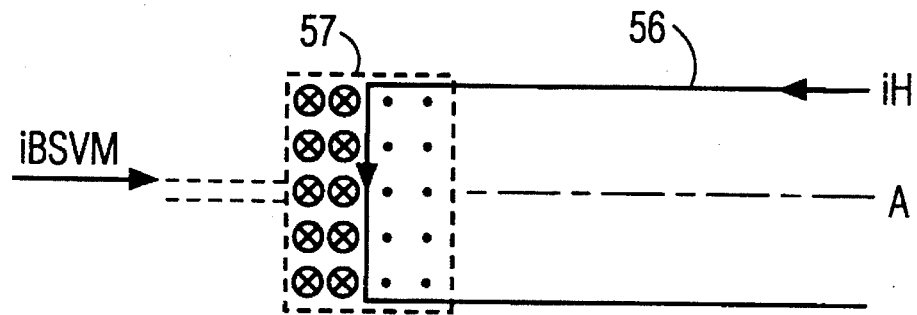

FIG. 9 a diagram useful in understanding the combined operation of the deflection coils.

In the drawing, and throughout this document, H means the horizontal direction and V the vertical direction.

Figure 1:
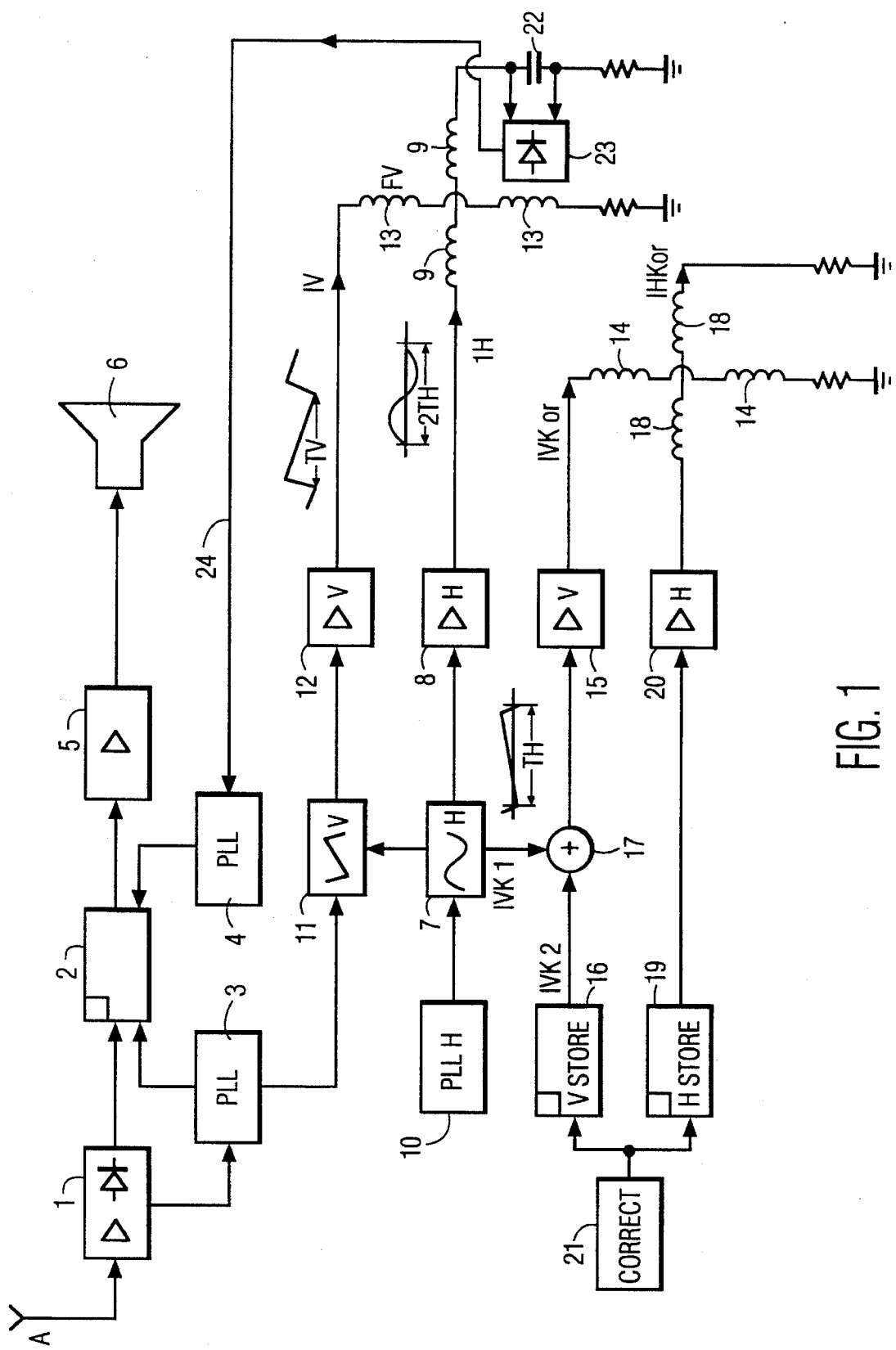

In FIG. 1, a television signal is received by the antenna A and supplied to the input circuit 1. Input circuit 1 contains a tuner, an AF amplifier and a decoder for recovering the picture signal. The picture signal e.g. the FBAS signal, color difference signals, luminance signal or RGB signals reach a video signal store 2. Store 2 is clocked by a PLL circuit 3 that is synchronized by the input signal. The received picture signals are initially written into the store 2. The PLL circuit 4, with which the picture signals are read out such that they are matched to symmetrical deflection, is provided for the read out process. The store 2 contains e.g. FIFO and FILO stores with which the signal sequence in each second line is inverted in order that these lines can be written from the right edge to the left edge of the picture. Moreover, during the read out of the signals, the duration, the phase angle and the waveform of the line deflection are taken in account to assure that the picture points of the original picture have the same spatial separation on the screen. The signals prepared in this manner reach the picture tube 6 via the video output stage 5.

A horizontal deflection generator 7 generates a horizontal deflection signal, in the form of a symmetrical sine wave, which is supplied via a power amplifier 8 to the horizontal deflection coils 9, which are driven in resonance. The line duration TH thus corresponds to the duration of half a period of the sinusoidal deflection current 1H. The PLL circuit 10 controls the horizontal deflection generator 7 and causes the sinusoidal control signal to always correspond to the resonance frequency of the deflection circuit during sinusoidal control of the line deflection coils 9. For this, the phase angle of the deflection current IH relative to the output voltage of the power amplifier 8 is measured continuously and controlled accordingly.

Figure 2A:
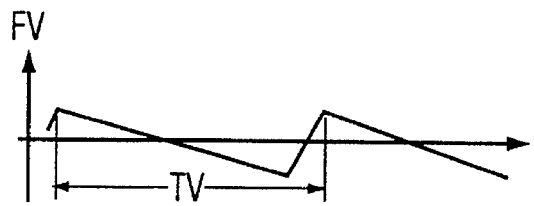
Figure 2B:
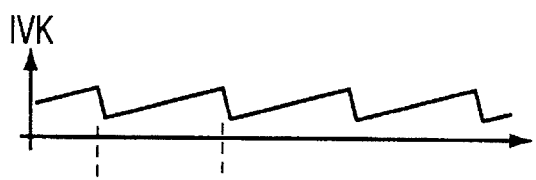
Figure 2C:
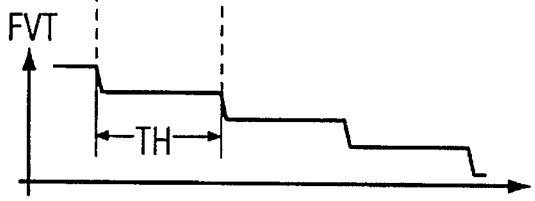

A vertical deflection generator 11 generates a saw tooth control signal which controls the vertical deflection coil 13 with a saw tooth voltage, having the time period TV of a frame, via a vertical output stage 12. Consequently, the deflection coils 13 initially generate a saw tooth deflection field FV, shown in FIG. 2a, in the picture tube 6. However, this deflection field is not suitable for symmetrical deflection since the lines written from left to right and from right to left would then diverge. Instead, the deflection field FV must have a step shaped waveform in which each step has the duration of one line TH. In order to achieve this, a line frequency correction voltage IVK1, shown in FIG. 2b, is supplied to an additional vertical auxiliary deflection coil 14 via a summing stage 17 and a wide band amplifier 15. Coil 14 generates a deflection field having the waveform shown in FIG. 2b in the picture tube 6. The deflection field of FIG. 2b is added to the deflection field FV shown in FIG. 2a. The slopes of the curves FV and IVK1 are the same value, but opposite in sign. Accordingly, during each line period TH a horizontal waveform is available as the deflection field FVT and the deflection field FVT over several line periods is a step shaped waveform shown in FIG. 2c. The superimposition of the waveforms FV and IVK1 shown in FIG. 2a and FIG. 2b into the composite step shaped deflection field FVT shown in FIG. 2c thus is not the result of the superimposition of the currents, but rather is the result of the combination of the two deflection fields generated in the picture tube 6 by the separate vertical deflection coils 13 and 14. The deflection coil 13 has an inductance of 20 uH for example, the auxiliary deflection coil 14 has an inductance of a few uH. It is therefore possible to use a deflection current having high frequency components i.e. the waveform shown in FIG. 2b, for the auxiliary deflection coil 14.

Figure 3A:
Figure 3B:
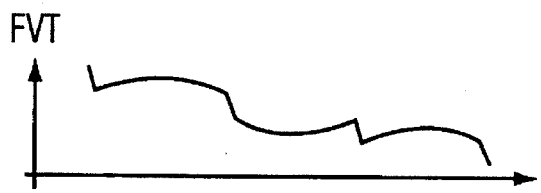
Figure 3C:
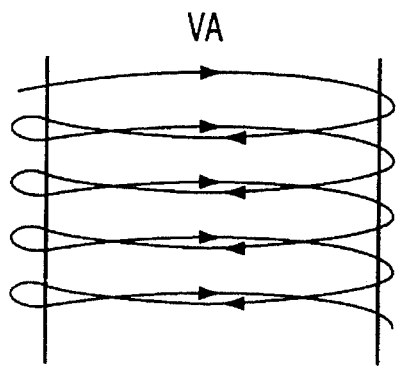

FIG. 3 shows a problem which occurs with the arrangement shown in FIG. 1. The deflection coils 9 and 13 are generally arranged above one another at the same axial position on the picture tube 6. Accordingly there is unavoidable cross-talk between the horizontal deflection coil 9 and the vertical deflection coil 13. This cross-talk is illustrated in FIG. 3a as ICT. The cross-talk of the sinusoidal horizontal deflection current results in a vertical deflection field FVT as shown in FIG. 3b. The vertical deflection due to this cross-talk causes the geometrically distorted vertical deflection VA shown in FIG. 3c, in which the lines have an undesirable curved shape. The cross-talk may lie in the region of the fundamental of the horizontal sinusoidal deflection current. However coupling in the region of the harmonics of the horizontal deflection current is also possible and the cross-talk does not have to be in phase with the horizontal deflection current, as illustrated in simplified form in FIG. 3c.

Figure 4A:
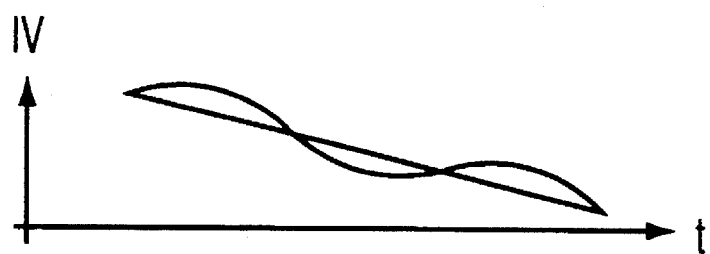
Figure 4B:
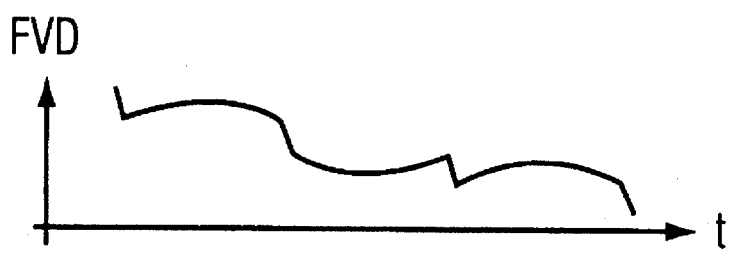
Figure 4C:
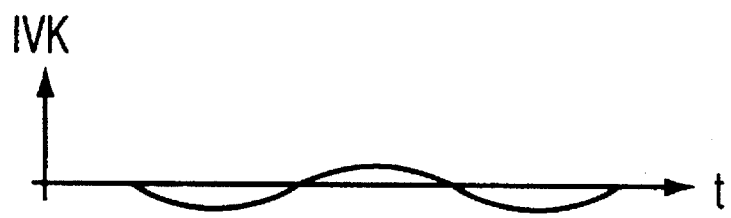
Figure 4D:
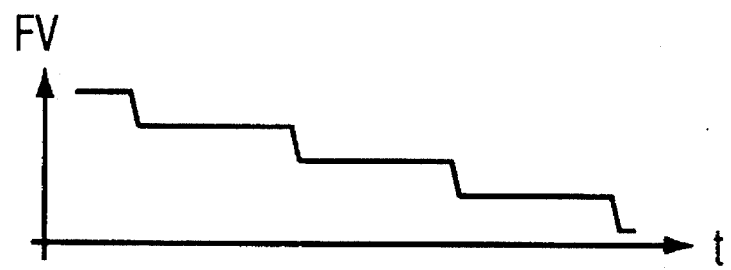

FIGS. 1 and 4a to 4b show how cross-talk of the type existing in the arrangement shown in FIG. 1 can be removed. In FIG. 1, the correction input 21 controls the store 16. A correction voltage IVK2, which is added to the correction voltage IVK1 in the summing stage 17, is read out from the store 16. Voltage IVK2 has the opposite phase to voltage ICT shown in FIG. 3a and compensates for the sinusoidal coupling of IH to IV, as shown in FIG. 4a. This compensation produces the distorted vertical deflection field FVD shown in FIG. 4b. The desired step shaped deflection field FV shown in FIG. 4d can be generated in the picture tube 6 through the vertical deflection coil 13 and the auxiliary deflection coil 14 by means of this compensation. The two dimensional correction function is stored by means of samples (m in the horizontal direction, n in the vertical direction). The actual correction function results from the two dimensional interpolation of these sample values.

In the horizontal direction, high symmetry of the horizontal deflection current is required for exact agreement of the forward and backward electron beam scanning to avoid double contours due to displacement of picture points in the horizontal direction. This symmetry can be disturbed due to insufficiently suppressed harmonics or even due to parasitic fields of the deflection coil. In FIG. 1, a horizontal auxiliary deflection coil 18, which is fed with a correction current IHKor, is provided for the purpose of making a fine correction in the horizontal direction. The horizontal correction signal which is necessary for this correction is generated in the horizontal correction store 19 and supplied to the auxiliary deflection coil 18 via the amplifier 20. In order to provide compensation of parasitic nonlinearities in the deflection field, a horizontal correction function is likewise formed of k,l samples (k in the horizontal direction, l in the vertical direction). The correction input 21 may be effected manually, or as a closed circuit using an optical recording system.

A deflection coil of low inductance of a few uH, which is in any case present for a modulation of the horizontal deflection speed for the purpose of improved image definition, may be used as the auxiliary deflection coil 18. Likewise, as the vertical auxiliary deflection coil 14, a deflection coil of low inductance, which is already present for the modulation of the vertical deflection speed for the purpose of increasing the vertical image definition, may be provided. The complete arrangement using a total of four deflection coils illustrated in FIG. 1 may fill a multiplicity of purposes. Such purposes are, the generation by the coil 13 of a saw toothed deflection field FV, shown in FIG. 2a, the conversion of this saw toothed deflection field into a step shaped deflection field FVT shown in FIG. 2c by the auxiliary deflection coil 14, the generation of a sinusoidal deflection field for symmetrical deflection in the deflection coil 9, the compensation of the cross-talk from the horizontal deflection coil 9 into the vertical deflection coil 13 by the correction current IVKor in the auxiliary deflection coil 14, the production of the symmetry of the sinusoidal horizontal deflection current IH by the correction current IHKor, the modulation of the horizontal deflection speed for the purpose of increasing the horizontal image definition by the auxiliary deflection coil 18 and the modulation of the vertical deflection speed for increasing the vertical image definition by the auxiliary deflection coil 14.

The read out of the signals from the store 2 by the PLL circuit 4 must occur exactly in phase with the line deflection current iH i.e. in such a way that the picture points of the original picture on the picture tube 6 again have the predefined spatial location. The capacitor 22, which effects matching of the horizontal deflection coil 9 to the frequency of the sinusoidal line deflection current IH, is therefore present in the path of the line deflection current IH. The voltage representing IH which is developed across the capacitor 22 is supplied to the evaluation circuit 23. This delivers a signal regarding the duration, the phase and the waveform of the line deflection current IH to the PLL circuit 4 over the lead 24. In dependence thereon, the read out of the signals appertaining to the individual picture points from the store 4 occurs in such a manner that the picture is written on the screen of the picture tube 6 with the correct geometry.

A further aspect of the invention provides an economical and simple means for attaching the auxiliary deflection coil. In a first step, a clamping ring used for the retention of the deflection unit on the neck of the tube and which usually consists of metal plate, is manufactured from a nonmetallic material, in particular from a synthetic material. A ring of synthetic material of this type having appropriately large dimensions has a sufficient rigidity. In a second step, the nonmagnetic clamping ring is also utilized to hold and mount the auxiliary deflection coil, or a plurality of auxiliary deflection coils. Thereby, the knowledge is utilized that the axial location of the clamping ring relative to the picture tube corresponds approximately to the optimal axial location of the auxiliary deflection coil. Since the clamping ring fits very tightly on the neck of the picture tube, the auxiliary deflection coil carried by the clamping ring can be brought into close proximity with the neck of the picture tube so that high deflection sensitivity is achieved. The auxiliary deflection coil is also easily mountable on the picture tube since the clamping ring is already generally available as a carrying means. Moreover, the location of the auxiliary deflection coil on the clamping ring has the effect that there is good decoupling of the auxiliary deflection coil from the actual deflection coil. The clamping ring thus fulfills a double function. It retains the deflection coil on the neck of the picture tube and also serves as a carrier for the auxiliary deflection coil.

Preferably, ferrite core pins are placed radially about the neck of the picture tube in borings in the clamping ring. The pins support coils which are radial to the neck of the picture tube. Two diametrically opposite core pins and a coil combination thus form an auxiliary deflection coil for either the horizontal direction or vertical direction depending upon the location of the pins. Two such pairs of core pins may also be provided on the clamping ring, a first pair having a horizontally directed magnetic field for the additional deflection in the vertical direction and a second pair having a vertically directed magnetic field for an additional deflection in the horizontal direction. The deflection sensitivity of the auxiliary deflection coil can be increased by enlarging the dimensions of the core pin at the end remote from the neck of the picture tube in that at this point, i.e. outside the coil, the core pin has a greater diameter or length. Additional improvement of the deflection sensitivity can be achieved by connecting the ends remote from the neck of the picture tube of two diametrically opposite core pins by means of a magnetically conductive bridge.

Figure 5:
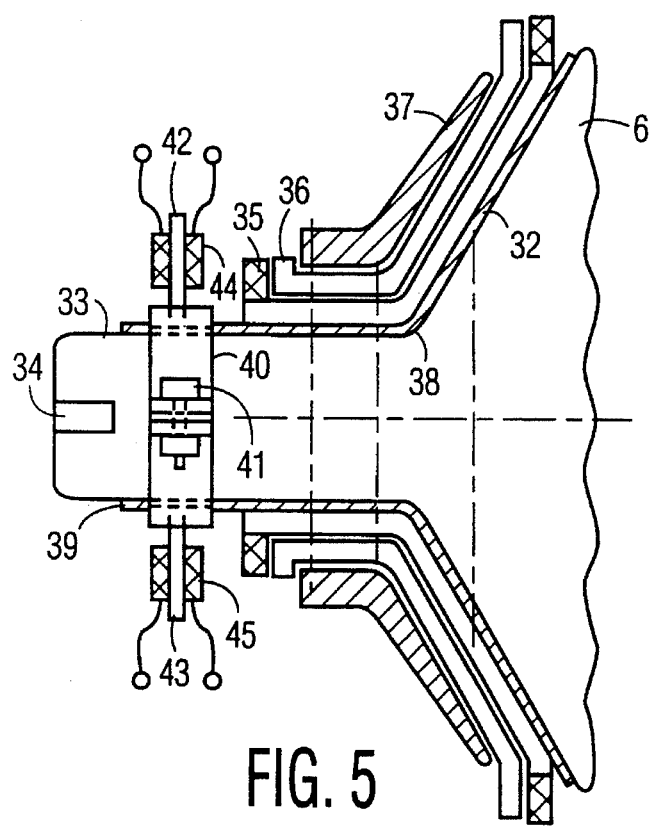
FIG. 5 shows a picture tube including a deflection coil and an auxiliary deflection coil.

In FIG. 5, a picture tube 6 has funnel portion 32 and a neck portion 33, which includes electron guns 34. A horizontal deflection saddle coil 35, a vertical deflection saddle coil 36 and a ring shaped ferrite core 37 are mounted on the picture tube 6. These parts are supported by a housing 38 of synthetic material. At the end facing the tube socket, the housing 38 runs into a collar like flange 39 which fits tightly against the neck of the tube 33 and is made radially flexible by means of slits. A clamping ring 40, consisting of two similar parts, is placed over this flange 39. The two parts are drawn together by screws 41 whereby the housing 38 is firmly clamped to the neck of the tube 33.

Two core pins 42 and 43, which each respectively support coils 44 and 45, are inserted, e.g., cemented, into the clamping ring 40 at two diametrically opposite locations. An additional high frequency deflection current, which preferably serves to modulate the horizontal deflection speed to increase the horizontal image definition or to displace each second line by a spacing of two lines in the vertical direction for halving the visible lines and forming a desired dark space between the lines, is supplied to the coils 44 and 45. In the position of the core illustrated, a vertically directed magnetic field, which provides the additional horizontal deflection, is generated in the neck of the tube 33 by the auxiliary deflection coil.

Figure 6:
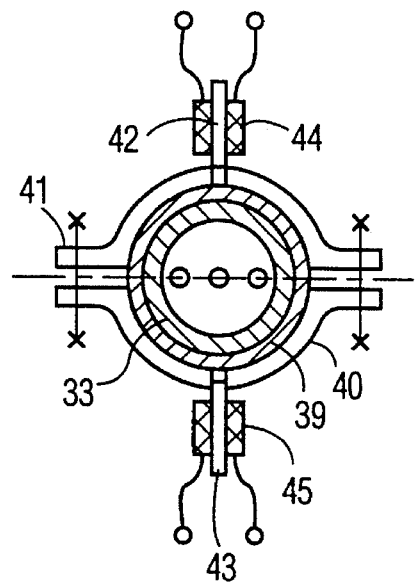
FIG. 6 is an end view of FIG. 5.

FIG. 6 is a section through the neck of the tube 33. The core pins 42 and 43 reach to the outer edge of the flange 39, i.e, they are placed as closely as possible to the electron beams emitted by the guns 34 in order to maximize the deflection sensitivity.

Figure 7:
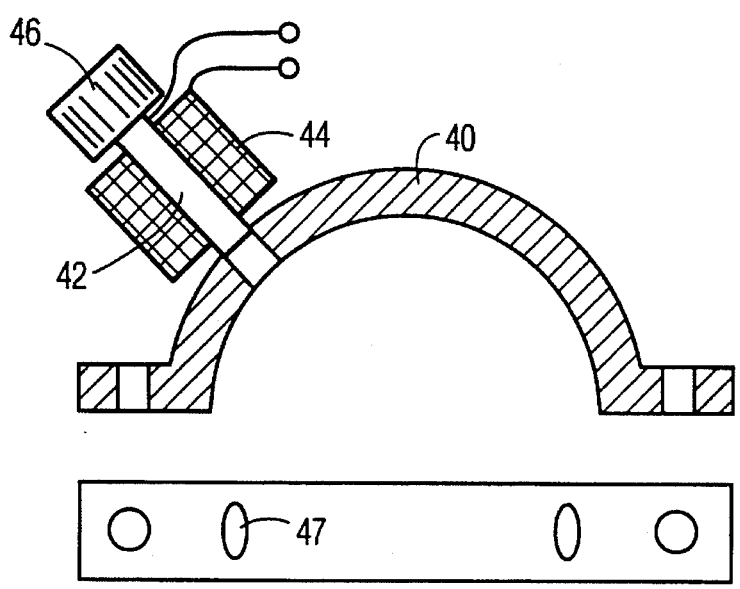
FIG. 7 shows the clamping ring in detail.

FIG. 7 shows the construction of the clamping ring 40. The core pin 42, which carries the coil 44, is fitted into a bore 47. The complete clamping ring 40 consists of two identical halves which are joined together mirror-like so that two core pins are diametrically opposite relative to the neck of the tube 33. The core pin 42 has an end portion 46 which is greater in diameter or length than the main portion of the pin. The deflection sensitivity of the auxiliary deflection coil is thus increased. The deflection sensitivity may also be increased by connecting the outer ends 46 of the cores 42 and 43 with a magnetically conductive bridge. The clamping ring 40 is made from synthetic material, preferably a synthetic material known under the trade name Makralon. The clamping ring shown in FIG. 7 can have a width of approximately 8 mm and the core pins 42 and 43 can have a diameter of 5 mm and a length of 20 mm, for example.

A system for improving the image definition using a deflection unit of this type by modulating the horizontal deflection speed in dependence on the video signal is described in "nachrichten electronik" No. 36 (1982), Issue, 4, pages 155–158. In a system of this type, a pulse, which temporarily increases the deflection speed, is obtained by differentiation during e.g. a black/white transition of the video signal. For a white/black transition, a negative pulse is obtained by differentiation which temporarily reduces the line deflection speed. In this manner, the transitions in the video signal are reproduced with a steeper leading edge. This system is also referred to as BSVM (beam scan velocity modulation).

For geometrical reasons, the auxiliary deflection coil for such a system lies in the region of the rear end of or above the line deflection coil. Due to the close proximity of the two deflection coils to one another, a coupling exists between the line deflection coil and the auxiliary deflection coil. This coupling can lead to partial oscillations of the line deflection current, so-called "ringing", which manifests itself by picture distortions at the left hand edge of the picture. The partial oscillations arise, in essence, because the high frequency currents in the auxiliary deflection coil are effective on the line deflection coil due to the coupling and thus stimulate the latter into oscillation. Partial oscillations of this type can also be stimulated in the course of a line because the high frequency currents in the auxiliary deflection coil can appear at any point of the forward line scan in dependence on the video signal.

With the invention, the coupling between the auxiliary deflection coil and the line deflection coil, and thus the range of partial oscillations in the line deflection current, is reduced without expenditure on additional circuitry. This development is based on the following knowledge. There is a point, a neutral zone so to speak, in the relative axial location of the auxiliary deflection coil to the line deflection coil, at which the auxiliary deflection coil is influenced by equal but opposite field lines from the line deflection coil. The sum of the effective magnetic lines of force within the surface of the auxiliary deflection coil is then zero, or very nearly so. This means that the coupling between the two coils is practically zero, or very nearly so, and consequently the coils no longer influence each other electrically. A substantial advantage exists in that practically no expenditure for physically changing the coils is necessary and the reduction of the coupling is achieved merely through the particular geometrical positioning of the two coils relative to one another. After the position of the auxiliary deflection coil in the neutral zone has been empirically determined, the position is the same for all picture tubes of a particular series. An additional advantage is that no additional electrical circuits are required. Due to the reduced coupling, the auxiliary deflection coil can be placed very close to the line deflection coil and the deflection sensitivity of the auxiliary deflection coil is increased. The determination of the optimal position in the neutral zone is preferably done empirically. Thereby, the line deflection coil for example is fed with deflection current and the auxiliary deflection coil is axially displaced relative to the line deflection coil until such time as the voltage induced in the auxiliary deflection coil by the deflection current is a minimum. Due to the minimized coupling between the coils, a greater current can be fed to the auxiliary deflection coil without the danger of partial oscillations occurring in the line deflection current.

Figure 8:
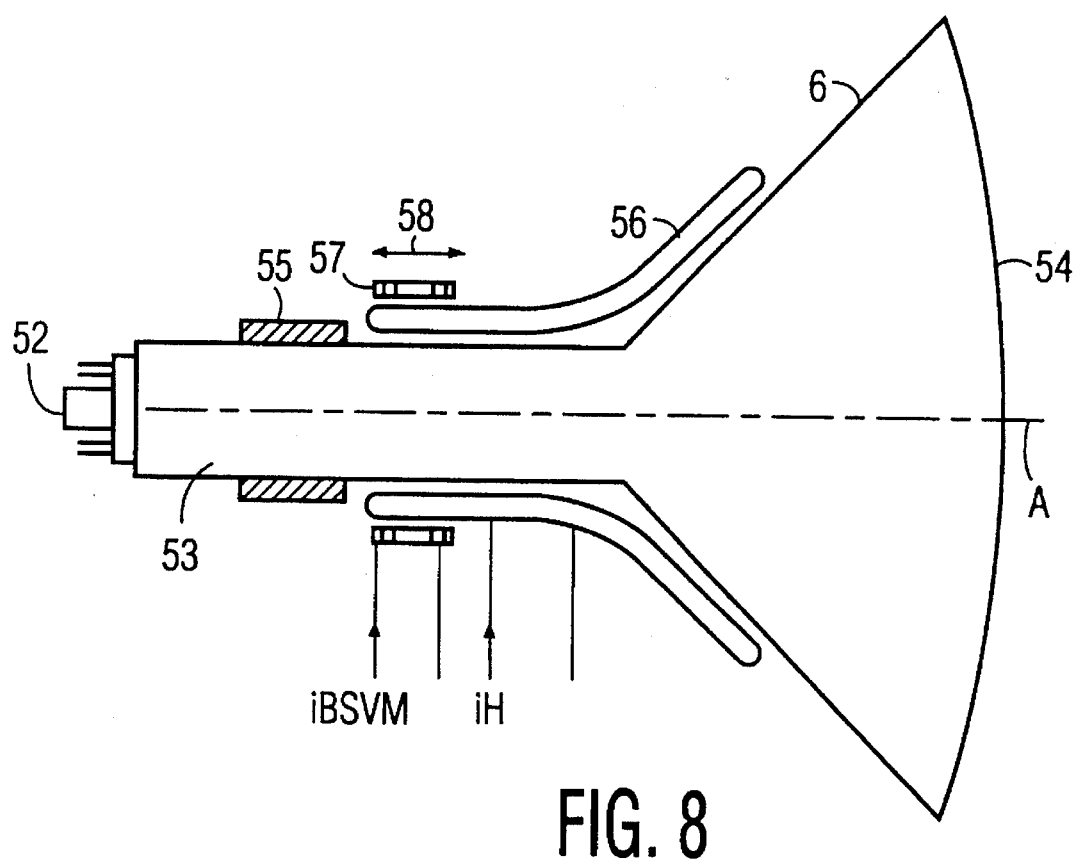
FIG. 8 shows a picture tube having the two deflection coils.

FIG. 8 shows a picture tube having a socket 52, a neck 53, a screen 54 and convergence magnets 55. The picture tube 6 supports a saddle shaped line deflection coil 56, which is fed the line deflection current iH. An auxiliary deflection coil 57 for the additional modulation of the line deflection speed, which modulates and which consists of only a few windings is arranged above the line deflection coil 56 in the region of the coil heads at the end nearest the socket 52. By displacing the auxiliary deflection coil 57 relative to the line deflection coil 56 in the direction indicated by arrow 58, the auxiliary deflection coil 57 is positioned at a neutral zone where the coupling between the coils 56 and 57 is a minimum. The auxiliary deflection coil 57 is controlled by the current iBSVM which increases or decreases the line deflection speed in dependence on the video signal and thereby effects an increase of the image definition.

The optimal position of the auxiliary deflection coil 57 in the neutral zone is determined empirically. The line deflection coil 56 is fed in the usual manner by a line deflection current iH. Due to the coupling between the coils 56 and 57, this current produces a voltage in the auxiliary deflection coil 57 in accordance with the transformer principle. This voltage is indicated on a meausuring instrument or an oscilloscope. The auxiliary deflection coil 57 is now displaced in the direction 58 until the amplitude of the voltage induced in the coil 57 is a minimum. It is equally possible to feed a current into the auxiliary deflection coil 57 and set its axial position at a minimum of the voltage induced in the line deflection coil 56.

The operation of auxiliary coil 57 is explained with reference to FIG. 9. For simplification, both coils include only one winding. FIG. 9 is a top view of the deflection coils of the picture tube 6 disposed on a horizontal axis A. The line deflection coil 56 generates a magnetic field having magnetic lines of force represented dots for one direction and circled crosses for the other direction. When the auxiliary deflection coil 57 is set at the neutral zone, the surface of by the coil 57 is traversed lines of force in both directions. Because the auxiliary deflection coil 57 is traversed by substantially equal lines of force in both directions the current induced in the auxiliary deflection coil 57 by the line deflection coil 56 is practically equal to zero. This means that practically no coupling exists between the two coils 56 and 57 and consequently the current iBSVM of the auxiliary deflection coil 57 can no longer influence the deflection current iH of the line deflection coil 6 and stimulate partial oscillations.

The auxiliary deflection coil 57 is preferably constructed as a saddle coil on a flexible foil using printed circuit techniques. The coil 57 is arranged such that it generates a vertically directed field for the deflection in the horizontal direction in the neck of the tube.

We claim:

1. A method for symmetrical horizontal scanning in a television tube, comprising the steps of:

energizing a vertical deflection coil of said tube with a sawtooth vertical scanning current having a first slope during vertical trace to generate a first vertical deflection field; and, energizing an auxiliary vertical deflection coil of said tube with a sawtooth vertical auxiliary current having a line frequency and a second slope during horizontal trace equal but opposite to said first slope of said vertical scanning current to generate a second vertical deflection field, said first and second vertical deflection fields being superimposed in said tube to produce a stepped vertical deflection field.

2. The method of claim 1, further comprising the step of also energizing said vertical deflection coil with a line frequency current to compensate for cross-talk between said vertical deflection coil and a horizontal deflection coil of said tube.

3. The method of claim 2, further comprising the step of energizing an auxiliary horizontal deflection coil of said tube with a horizontal frequency correction current to achieve exact spatial positioning of all picture points on horizontal scanning lines during said symmetrical horizontal scanning in both directions.

4. The method of claim 1, further comprising the step of energizing an auxiliary horizontal deflection coil for correcting spatial positioning of picture points on horizontal scanning lines and for modulating beam scan velocity.

5. A deflection circuit for symmetrical horizontal scanning in a television tube, comprising:

a vertical deflection coil, an auxiliary vertical deflection coil and a horizontal deflection coil mounted on said tube;

means for providing a vertical sawtooth scanning current having a first slope during vertical trace for energizing said vertical deflection coil to generate a first vertical deflection field; and, means for providing a vertical auxiliary sawtooth current, having a line frequency and a second slope during horizontal trace equal but opposite to said first slope of said vertical scanning current, for energizing said auxiliary vertical deflection coil to generate an auxiliary deflection field, said first vertical deflection field and said auxiliary vertical deflection field being superimposed in said tube to produce a composite, stepped vertical deflection field.

6. The deflection circuit of claim 5, further comprising:

an auxiliary horizontal deflection coil; and, means for energizing said auxiliary horizontal deflection coil with a horizontal frequency correction current to generate an auxiliary horizontal deflection field in said tube to achieve exact spatial positioning of all picture points on horizontal scanning lines during said symmetrical horizontal scanning in both directions.

7. The deflection circuit of claim 5, further comprising:

an auxiliary horizontal deflection coil;

first means for energizing said auxiliary horizontal deflection coil with a horizontal frequency correction current for correcting spatial positioning of picture points on horizontal scanning lines; and, second means for energizing said auxiliary horizontal deflection coil with a second horizontal correction current for modulating beam scan velocity.

8. The deflection circuit of claim 5, wherein said auxiliary vertical deflection coil has a substantially lower inductance than said vertical deflection coil.

* * * * *